United States Patent Office 2,999,745
Patented Sept. 12, 1961

2,999,745
PROCESS OF DEFOLIATING COTTON PLANTS
Albert Bloom, Summit, N.J., assignor to General Aniline & Film Corporation, New York, N.Y., a corporation of Delaware
No Drawing. Filed Oct. 23, 1958, Ser. No. 769,098
5 Claims. (Cl. 71—2.7)

The present invention relates to the defoliating of growing cotton plants, and particularly to an improved chemical defoliation of living cotton plants which accelerates leaf fall.

In the mechanical harvesting of growing cotton plants, the presence of excessive foliage is undesirable, since the mechanical devices used will harvest the crop together with whatever foliage is in its proximity. By removing the foliage at the time of harvesting, it is probable that late season blight and undesired developments may be avoided.

A defoliant is a substance which when applied to a growing plant which normally undergoes defoliation during its life cycle at maturity causes an accelerated dropping of the leaves without destroying the plant. For economic reasons, a defoliant must be effective in relatively low concentrations.

It has been established that defoliation results in higher grades of cotton, because under good conditions few leaves remain to clog spindles, air trash or stain the fibre. Chemical defoliation has a tendency to straighten up the plant and as a consequence increase their exposure to sun and air. This enables the cotton plant to dry more quickly and thoroughly and opens the mature bolls much faster. Chemical defoliation is also advantageous in that it reduces population of damaging insects particularly aphids and whiteflies, both of which cause honey-dew deposit in the open bolls.

The application of a chemical defoliant to cotton plants depends upon many factors. For example, if a cotton boll is easily cut through even though it is not mature, that is, if the fibre "strings" and the youngest bolls cannot be dented by pressure between thumb and two fingers, it is satisfactory to apply the defoliants.

Many materials have been suggested as defoliants. Among these are included such products as pentachlorophenol, sodium chlorate, magnesium chlorate, magnesium chlorate hexahydrate, calcium cyanamide, sodium 3,6-endoxohexahydrophthalate, etc. The latter compound has not been widely accepted, because depending upon temperature and humidity has a tendency of desiccating the leaves thus freezing them to the plant. Desiccation or drying out is not defoliation and results in trashy seed cotton requiring extra cleaning and ginning which often reduces staple length. Calcium cyanamide is not operative without dew. The chlorates are all very dangerous unless mixed with fire suppressors. In other words, all of the chlorates presently employed are potential fire and explosion hazards. While it is admitted that the chlorate defoliants as commercially formulated are relatively safe, no untrained person can or should attempt such formulation. Numerous fires have resulted from the chance mixing of chlorate defoliants and organic insecticides.

I have found that the foregoing disadvantages are readily overcome by the employment of trichloro alkanols as chemical defoliants which are not potential fire and explosion hazards, and which may be formulated with ease even by untrained persons.

I have further found that trichloro alkanols of 2 to 5 carbon atoms are very effective as cotton defoliants when employed in a concentration ranging from .5% to 1.5% by weight in a liquid medium. The trichloro alkanols employed are characterized by the following general formula:

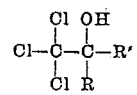

wherein R represents either hydrogen or methyl, and R' represents either hydrogen, methyl or ethyl.

As specific examples of the trichloroalkanols characterized by the foregoing general formula and which are well known, the following are illustrative:

(1) 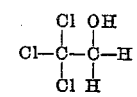

(2) 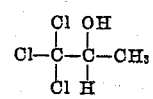

(3) 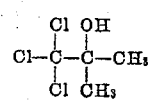

(4) 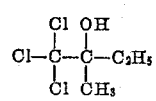

The foregoing trichloro alkanols may be applied alone or in combination with each other, i.e. individually or in admixture. The trichloro alkanol defoliants are best applied in a liquid carrier. When water is to be employed as part of the liquid carrier, the trichloro alkanol or mixtures thereof is first dissolved in a suitable water-miscible organic solvent, such as acetone, methyl ethyl ketone, dioxane, and the like, to which has been added a sufficient quantity of any commercially available surface active agent which will maintain the dispersion of the trichloro alkanol in the liquid medium. Any of the well known and commercially available surface active agents may be employed, such as for example, the alkali metal salts of long chain alkyl sulfates, alkali metal salts of alkyl aryl sulfonic acids, polyethylene glycols ethers of alkyl phenols, etc. Products of this type are legion and no difficulty will be encountered in the selection of the most suitable surface active agent which will depend of course upon price, availability, etc.

The trichloro alkanols may also be applied in non-aqueous media, such as light, i.e. purified, petroleum hydrocarbons particularly light mineral seal oil, decolorized kerosene, refined gas oil and very light lubricating oils and the like, which are normally employed in agricultural sprays, or in emulsion form. In the latter case, a defoliating amount of the trichloro alkanol is first dissolved in the smallest quantity possible of either acetone, methyl ethyl ketone or dioxane and the solution diluted with a desired quantity of a light petroleum hydrocarbon containing a sufficient amount of any well known surface active agent as emulsifier.

The amount of the trichloro alkanol to be employed for any particular defoliation will depend of course on the degree of defoliation desired, the maturity of the plant, the liquid carrier employed and the weather conditions at the time of application. In general, the defoliating amount may range from 0.5 to 2½% by weight of the trichloro alkanol per 97.5 to 99.5% by weight of liquid carrier. For practical purposes, I have found that an amount ranging from 0.5 to 1.5% by weight of the trichloro alkanol or mixtures thereof is sufficient to yield a sprayable composition which will insure complete coverage of the foliage and defoliate the leaves.

To prepare the suspension of the trichloro alkanol in an aqueous medium, a sufficient quantity of the trichloro alkanol or mixtures thereof is first dissolved in a sufficient quantity of the aforementioned water-miscible organic solvents to yield 20-30% by weight. The resulting concentrated solution is then diluted with water to yield a concentration of from 0.5 to 1.5% by weight of the trichloro alkanol. The water used to dilute the concentration solution should contain a sufficient quantity of any well known surface active agent to keep the precipitated trichloro alkanol or mixtures thereof suspended. During the course of my investigations, I employed as the surface active agent a product obtained by the condensation of 1 mole of dinonyl phenol with 15 moles of ethylene oxide.

In order to demonstrate the defoliant activity of the foregoing trichloro alkanols, the following test procedure was employed.

The test plants consist of cotton (Coker 100 variety) and must have 10 to 12 leaves. The formulation of the defoliant solution is prepared as noted above, and the following test conducted:

Setting up the test: Two cotton seeds are planted in a 4" clay pot. Seeds are covered and watered. They are grown in greenhouse with minimum night temperature of 70° F. until they reach proper test age, which takes approximately 2½–3 months. Beginning September 1, supplemental light by means of overhead incandescents must be provided in the amount of 4 hrs. per night. Two 4" pots are needed for each chemical at each level plus two untreated controls and four for standards.

Method of treatment: The plants are sprayed with solutions until run-off occurs. Plants are removed to a place where they may dry and then placed in greenhouse on bench.

Environmental control: Greenhouse. Care must be exercised to avoid contact between plants of different levels of treatment or different chemical treatment. Care must be exercised to avoid wetting foliage during the first 3 days following treatment.

Duration of test: Readings are taken on the mature leaves remaining after 14 days and 30 days. Any unusual effects which are noted should be recorded.

Type of data: Counts are made of the mature leaves remaining and notes are made of unusual effects. Each treatment is to be compared with the untreated control when readings are taken.

A 1% solution of each of the trichloro alkanols numbered from 1 to 4 inclusive, was first prepared by dissolving 10 grams of the trichloro alkanol in 100 grams of acetone and 900 grams of water containing 2 grams of a surface active agent, obtained by condensing one mole of dinonyl phenol with 15 moles of ethylene oxide. A control solution consisting merely of acetone, water and surface active agent was also prepared. Each of the enumerated trichloro alkanols was subjected to between 2 and 3 individual tests. After the tests were complete, the following data was obtained:

| Defoliant Trichloroalkanol of Illustration | Number of Tests | Number of Mature Leaves Remaining on the plant |
|---|---|---|
| No. 1 | 2 | 3, 1 |
| No. 2 | 3 | 2, 1, 1 |
| No. 3 | 3 | 2, 1, 2 |
| No. 4 | 2 | 3, 2 |
| Control | 3 | 9, 8, 9 |

From the foregoing results, it is clearly manifest that the trichloro alkanols are very effective defoliants.

I claim:

1. The process of defoliating cotton plants which consists of applying to the leaves at a rate sufficient to cause defoliation of said plants a liquid composition comprising a water-miscible organic solvent containing as active defoliant 0.5 to 2.5% by weight of a trichloro alkanol having the following general formula:

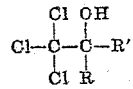

wherein R represents a member selected from the class consisting of hydrogen and methyl, and R' represents a member selected from the class consisting of hydrogen, methyl and ethyl.

2. The process according to claim 1 wherein the trichloro alkanol has the following formula:

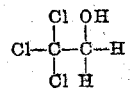

3. The process according to claim 1 wherein the trichloro alkanol has the following formula:

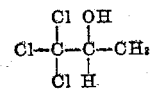

4. The process according to claim 1 wherein the trichloro alkanol has the following formula:

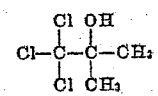

5. The process according to claim 1 wherein the trichloro alkanol has the following formula:

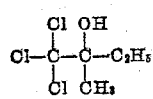

References Cited in the file of this patent

UNITED STATES PATENTS

| | | |
|---|---|---|
| 2,394,916 | Jones | Feb. 12, 1946 |
| 2,446,454 | Bergmann et al. | Aug. 3, 1948 |
| 2,626,862 | Zimmerman et al. | Jan. 27, 1953 |
| 2,668,758 | Roos et al. | Feb. 9, 1954 |
| 2,931,839 | Kundiger | Apr. 5, 1960 |

FOREIGN PATENTS

| | | |
|---|---|---|
| 1,003,497 | Germany | Feb. 28, 1957 |